No. 763,347. Patented June 28, 1904.

UNITED STATES PATENT OFFICE.

OTTO P. AMEND, OF NEW YORK, N. Y.

PROCESS OF BATING OR PURING SKINS.

SPECIFICATION forming part of Letters Patent No. 763,347, dated June 28, 1904.

Application filed September 3, 1903. Serial No. 171,849. (No specimens.)

*To all whom it may concern:*

Be it known that I, OTTO P. AMEND, a citizen of the United States, residing at New York city, in the county of New York and State of New York, have invented new and useful Improvements in Processes of Bating or Puring Skins, of which the following is a specification.

Hitherto in the manufacture of leather it has been the custom in bating, abating, graincring, reducing, drenching, or puring of skins to utilize the dung of dogs, pigeons, and chickens or bran-water to remove the lime or other alkali used for depilation and to soften the skins preparatory to the application of the tanning liquor.

The object of my invention is to obviate the difficulties attending the use of these ingredients and not only to improve upon the methods hitherto employed, but to improve the product as well, and is achieved by utilizing the valuable ingredients of the animal manure without incurring the bad results of the bacteriological action thereof.

I have found that when hides are immersed in a manure-bath there is a distinct action, with the result of producing free ammonia, while the skins "fall," which is due to the decomposition of salts of ammonia.

From a purely chemical standpoint a dilute solution of an acid known to form a soluble salt with lime, such as hydrochloric acid, would seem to be all that is required; but in practice it is found that the action of such mineral acids causes intense swelling and the hide assumes a transparent gelatinous appearance and loses its fibrous character, thereby rendering it unfit to be converted into leather. Nevertheless an acid of some sort is theoretically the proper thing to use; but it must be an acid that will not disturb the fibrous nature of the hide, that will form soluble salts with alkaline bases, and that will not induce nor support fermentation. In other words, such an acid must be antiseptic and preservative in its action, while at the same time it performs all the other functions of a bate. I have discovered, however, that acids can be used provided they are used in the form of and in conjunction with an ammoniacal salt in solution. In this case the chemical reaction is analogous to that produced by the use of animal-excrement bates. Thus the ammonia salt is decomposed, the acid combines with the caustic lime and produces a salt of lime, and an equivalent part of the ammonia is set free. The ammonia so set free is neutralized by the addition of the acid, thus making a new ammoniacal salt which is ready to give up its acid to any lime which remains in the skin. At the same time part of the lime combines with the ammoniacal salt, forming a soluble double salt. Thus the hide substance is never attacked by a free acid and the skins "go down" and have the same quality and appearance as those produced by animal "bating." The hides can then be washed or put directly into the pickling-vats or, if desired, into the tanning-bath.

I am of course aware that ammonium salts without acids have been used for years past; but when present in sufficient quantity to neutralize the lime they develop so much free ammonia that it attacks the tissues of the skins or pelts to such an extent as to render them unfit for tanning. On the other hand the object of my invention is to use the ammonia as a carrier for the acid, and by using them both in conjunction in the manner stated I achieve that object and remove the lime in as neutral a condition as possible.

As an illustration of one practical method of pursuing my process I take, say, a dozen calf-skins from the lime. These are placed in a paddle-wheel containing seventy gallons of water in which I have dissolved, say, one-half pound of chlorid of ammonium, ($NH_4Cl$,) which is a cheap salt. The wheel is now set in motion, and in a very short time—say from ten to fifteen minutes—there is a perceptible odor of ammonia both in the hides and in the solution. I now allow the paddle-wheel to run long enough to allow the ammonia-salt solution to penetrate the hides. This may take, with calf-skins, from two to three hours, according to the thickness of the skins, and in the case of steer-hides penetration may take from ten to fifteen hours. After the skins have been in the paddle-wheel for an hour or so I add enough of an acid to again neutralize the solution—for instance, two ounces of hydrochloric acid, (HCl.) In an hour or so it will again be found that the skins and solution show the presence of free ammonia as the acid of the salt combines with the lime, and then I again add from one to two ounces of the acid. I have found that from two to six ounces of acid are needed, according to the amount of lime and alkali existing in the skins. In this way I utilize the ammonia as a slow carrier of the acid to the lime and prevent it from attacking the skins.

Of course I can use other acids than hydrochloric acid, (HCl.)

The terms "abating," "grainering," "reducing," "fall," "go down" wherever used in this specification are used in the sense in which they are used by tanners who are familiar with the state of the art and in the same sense as they are used in the standard work entitled *The Manufacture of Leather*, by Charles T. Davis, second edition, published at Philadelphia in 1897 by Henry Carey Baird & Co. and in London in 1897 by Sampson Low, Marston & Co., Ltd.

Having thus described my invention, what I claim is—

1. The process of bating skins or hides which consists in treating such hides or skins with an ammoniacal salt in solution, and reforming such salt, substantially as described.

2. The process of bating skins or hides which consists in treating such hides or skins with an ammoniacal salt in solution and subsequently adding small quantities of acid at intervals, substantially as described.

3. The process of bating skins or hides which consists in treating such hides or skins with an ammoniacal salt in solution, and subsequently adding small proportions hydrochloric acid at intervals, substantially as described.

OTTO P. AMEND.

Witnesses:
 EDMUND ELLSWORTH FIELD, Jr.,
 JOHN JAY CULLEN.